United States Patent [19]
Nobuta et al.

[11] Patent Number: 5,875,650
[45] Date of Patent: Mar. 2, 1999

[54] REFRIGERANT CONDENSER INCLUDING SUPER-COOLING PORTION

[75] Inventors: Tetsuji Nobuta; Hiroki Matsuo; Masahiro Shimoya, all of Kariya; Michiyasu Yamamoto, Chiryu; Etuo Hasegawa, Nagoya, all of Japan

[73] Assignee: Denso Corporation, Kariya, Japan

[21] Appl. No.: 110,664

[22] Filed: Jul. 6, 1998

[30] Foreign Application Priority Data

Jul. 10, 1997 [JP] Japan .................................... 9-185498
Feb. 18, 1998 [JP] Japan .................................. 10-036322
Jun. 9, 1998 [JP] Japan .................................. 10-161028

[51] Int. Cl.$^6$ ..................................................... F25B 39/09
[52] U.S. Cl. .............................. 62/509; 165/110; 165/132
[58] Field of Search ...................... 62/509, 474; 165/110, 165/132, 138, 175, 176, 173

[56] References Cited

U.S. PATENT DOCUMENTS 5,397,710  3/1995  Matsuo et al. ............................. 62/509
5,512,830  1/1997  Baba et al. ................................ 62/509

FOREIGN PATENT DOCUMENTS

A-8-219588  8/1996  Japan .

*Primary Examiner*—John M. Sollecito
*Attorney, Agent, or Firm*—Harness, Dickey & Pierce, PLC

[57] ABSTRACT

In a refrigerant condenser including a super-cooling portion, the super cooling portion is located in the upper position of a core portion. Thus, when a vehicle engine idles, and high temperature cooling air having passed through the refrigerant condenser and the vehicle radiator is lead to the air upstream side of the condenser through the lower portion of the condenser, because the super-cooling portion is located at the upper position of the core portion, the super-cooling portion is not influenced by the high temperature air.

9 Claims, 8 Drawing Sheets

REFRIGERANT CONDENSER INCLUDING SUPER-COOLING PORTION

CROSS REFERENCE TO RELATED APPLICATION

This application is based on and incorporates herein by reference Japanese Patent Application Nos. Hei. 9-185498 filed on Jul. 10, 1997, Hei. 10-36322 filed on Feb. 18, 1998, and Hei. 10-161028 filed on Jun. 9, 1998.

BACKGROUND OF THE INVENTION

1. Field of the Invention

The present invention relates to a refrigerant condenser for a vehicle air conditioning apparatus, in which a condensing portion where refrigerant is condensed and a super-cooling portion where liquid refrigerant separated in a receiver is super-cooled are formed integrally.

2. Description of Related Art

JP-A-8-219588 discloses a refrigerant condenser including a super-cooling portion and a receiver integrally. Liquid refrigerant separated in the receiver is super-cooled in the super cooling portion, for improving a cooling performance. The receiver is integrated with the refrigerant condenser for downsizing a space where the refrigerant condenser and the receiver are installed.

The conventional refrigerant condenser has first and second header tanks extending in the upper and lower direction, and a core portion disposed therebetween, which includes plural tubes through which the refrigerant flows horizontally. A refrigerant inlet pipe joint is provided at the upper end side of the first header tank, and a refrigerant outlet pipe joint is provided at the lower end side of the first header tank.

The insides of both header tanks are separated into plural spaces in the upper and lower direction, thus the refrigerant winds and flows from the refrigerant inlet pipe joint, and in the header tanks and the core portion.

The receiver is integrated with the second header tank, and the inside thereof communicates with the second header tank through a first communication hole formed at the lower portion of the header tank. The liquid refrigerant condensed in the condensing portion flows into the receiver through the first communication hole, and is stored therein.

A second communication hole is formed below the first communication hole, and a separator is provided in the second header tank for partitioning the first communication hole from the second communication hole. Thereby, the liquid refrigerant in the receiver flows into the second header tank through the second communication hole, and flows through the super-cooling portion while being super-cooled. The super-cooled liquid refrigerant flows out of the refrigerant condenser through the first header tank and the refrigerant outlet pipe joint.

In the conventional refrigerant condenser, the liquid refrigerant flows out of the receiver at the position in the vicinity of the bottom of the receiver, for constantly supplying the liquid refrigerant into the super-cooling portion even when the liquid refrigerant amount in the receiver fluctuates in accordance with the change of a cooling load. That is, the super-cooling portion is located at the lowest portion of the core portion.

However, when the vehicle engine idles, for example, to wait for a traffic signal, the cooling air having passed through the refrigerant condenser and a vehicle radiator might be lead to the air upstream side of the condenser through the lower portion of the condenser by the operation of a cooling fan, because there is no air flow generated by vehicle running. This cooling air has high temperature because it has passed through the condenser and the vehicle radiator, and heats the lower portion of the condenser. Therefore, the cooling performance of the supercooling portion is lessened, and the amount of the super-cooling of the liquid refrigerant is reduced.

SUMMARY OF THE INVENTION

The present invention is made in light of the foregoing problem, and it is an object of the present invention to provide a refrigerant condenser including a super-cooling portion, which prevents the degradation of a super-cooling performance caused by the air with the high temperature passing through the refrigerant condenser.

According to a first aspect of the present invention, a super-cooling portion is located in the upper position of a core portion, that is, the super-cooling portion is located above a condensing portion.

Thus, when a vehicle engine idles, and high temperature cooling air having passed through the refrigerant condenser and the vehicle radiator is lead to the air upstream side of the condenser through the lower portion of the condenser, because the super-cooling portion is located at the upper position of the condensing portion, the super-cooling portion is not influenced by the high temperature air.

Therefore, the cooling performance of the super-cooling portion is kept well, and the reduction of the super-cooling degree of the liquid refrigerant is suppressed.

According to a second aspect of the present invention, a refrigerant passage is formed in a connecting surface between a receiver and a header tank, and an upper space is formed in the header tank for making the refrigerant passage communicate with a super-cooling portion.

Thus, liquid refrigerant in the receiver is introduced into the super-cooling portion through the refrigerant passage and the upper space without providing an external refrigerant pipe, thereby simplifying the step of manufacturing and reducing the cost thereof.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
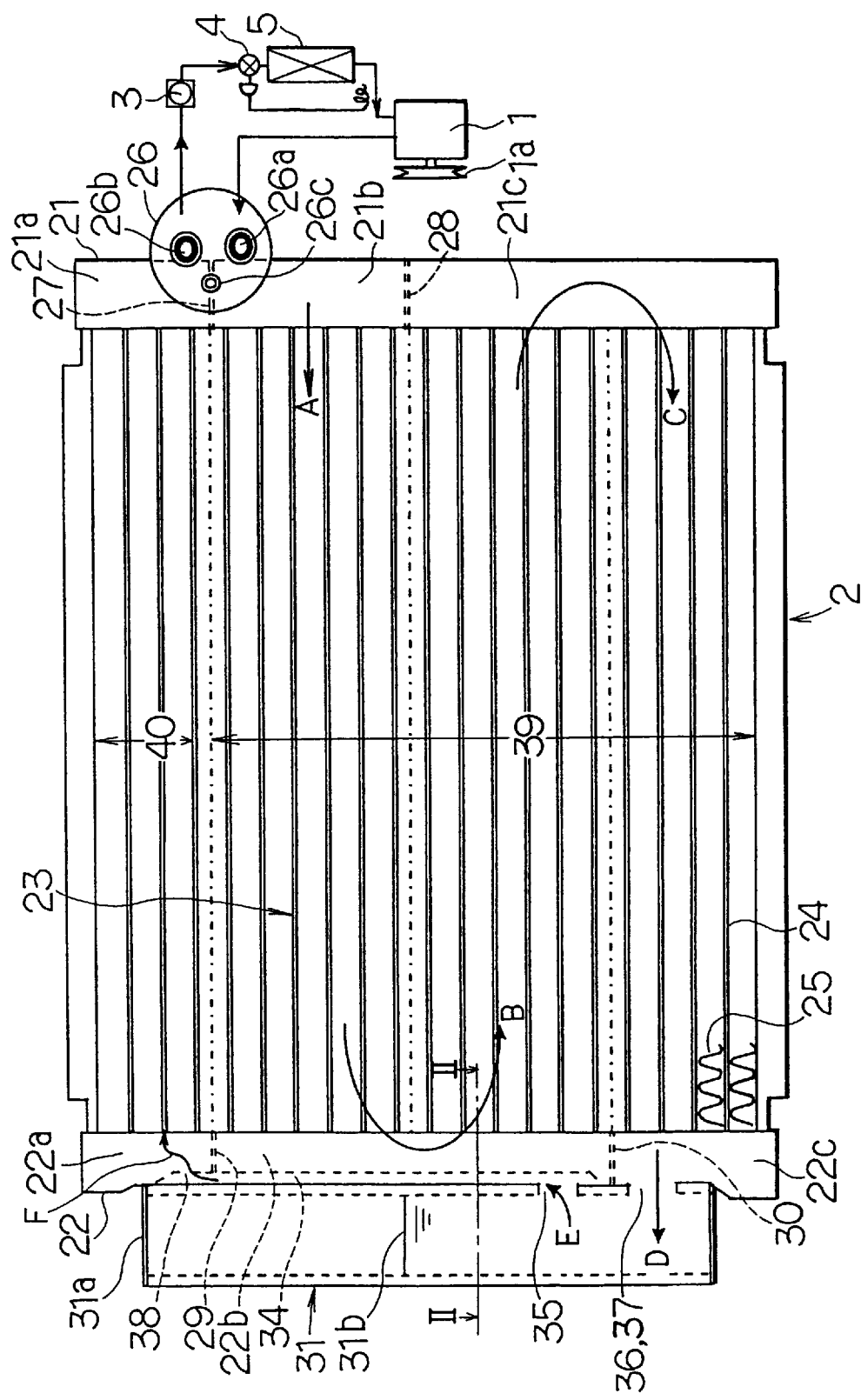
FIG. 1 is a front view showing a refrigerant condenser according to a first embodiment.

Referring to the drawings, preferred embodiments of the present invention will be described.

(First Embodiment)

In a first embodiment, a refrigerant condenser of the present invention is employed in a refrigeration cycle for a vehicle air conditioning apparatus. The refrigeration cycle includes a compressor 1, a refrigerant condenser 2, a receiver integrated with the condenser 2, a site glass 3, a temperature responsive expansion valve 4, and a refrigerant evaporator 5. These instruments are orderly connected with each other by a refrigerant pipe made of metal or rubber.

The compressor 1 is driven by receiving a driving force from a vehicle engine through an electromagnetic clutch 1a. The compressor 1 sucks, compresses and discharges the refrigerant. The refrigerant condenser 2 cools and condenses gas refrigerant, which is discharged from the compressor 1, into liquid refrigerant, and further super-cools the same. The refrigerant condenser 2 is, as well known, disposed at the front most position (front position of a vehicle radiator for an engine) in an engine room of the vehicle. The refrigerant condenser 2 is cooled by a cooling air generated by a cooling fan as well as the vehicle radiator.

The temperature responsive expansion valve 4 pressure-reduces and expands the liquid refrigerant, which is super-cooled in the refrigerant condenser 2, into gas-liquid phase refrigerant. The refrigerant evaporator 5 carries out a heat exchange between the gas-liquid phase refrigerant and air to be conditioned. The gas-liquid phase refrigerant is evaporated and the air to be conditioned is cooled in the evaporator 5.

The refrigerant condenser 2 includes a first and second header tanks 21, 22. These header tanks 21, 22 are formed into cylindrical shape and extend in the upper and lower direction. A core portion 23 for carrying out a heat-exchange is disposed between the first and second header tanks 21, 22.

In the refrigerant condenser 2, a plurality of oval flat tubes 24 through which the refrigerant flows horizontally are provided between the first and second header tanks 21, 22. A corrugated fin 25 is provided between each adjacent tube 24 for improving a heat transmitting efficiency. One end of the oval flat tube 24 communicates with the inside of the first header tank 21, and the other end thereof communicates with the inside of the second header tank 22.

A joint block 26 through which the refrigerant flows into and flows out of the refrigerant condenser 2 is connected to the upper portion of the first header tank 21.

The joint block 26 is made of aluminum, and includes a refrigerant inlet 26a and a refrigerant outlet 26b. The joint block 26 further includes an insertion hole 26c for connecting with a joint block (not illustrated) of an external refrigerant pipe.

An upper side separator 27 and a lower side separator 28 are provided inside the first header tank 21. In a similar way, an upper side separator 29 and a fourth separator 30 are provided inside the second header tank 22. Thus, the inside of the first header tank 21 is separated into three spaces 21a, 21b, 21c in the upper and lower direction, and the inside of the second header tank 22 is separated into three spaces 22a, 22b, 22c. The refrigerant inlet 26a of the joint block 26 communicates with the center space 21b, and the refrigerant outlet 26b communicates with the upper space 21a of the first header tank 21.

The refrigerant flows through the refrigerant inlet 26a, and wind-flows inside the refrigerant condenser 2, i.e., the first and second header tanks 21, 22 and the core portion 23.

A receiver 31, where the refrigerant is separated into gas refrigerant and liquid refrigerant, and the liquid refrigerant is stored, is formed at the outside of the second header tank 22 integrally. The receiver 31 is also formed into cylindrical shape, and the height thereof is a little shorter than that of the second header tank 22. The receiver 31 is welded to the outside wall of the second header tank 22.

Figure 2:
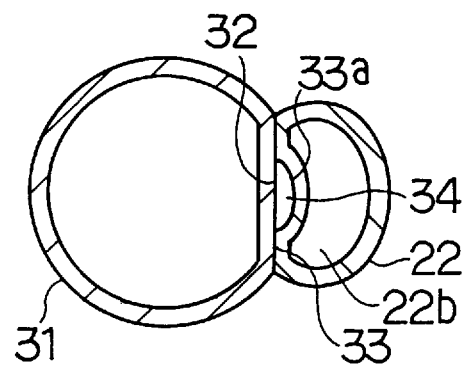
FIG. 2 is a cross sectional view taken along line II—II in FIG. 1.
Figure 3:
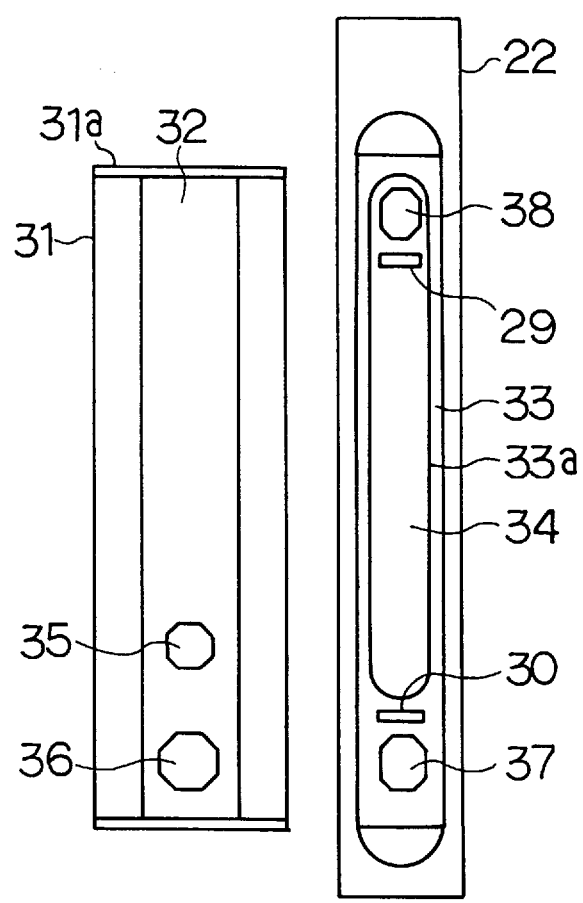
FIG. 3 is an exploded view showing a connecting surface between a receiver and a second header tank in the refrigerant condenser according to the first embodiment.

The detailed structure making the receiver 31 communicate with the second header tank 22 is shown in FIGS. 2, 3. The receiver 31 and the second header tank 22 have flat connecting surfaces 32, 33 respectively, for improving a connecting performance between the receiver 31 and the second header tank 22. The receiver 31 and the second header tank 22 are integrally connected with each other at the flat connecting surfaces 32, 33. In the present first embodiment, the connecting surface 33 of the second header tank 22 has a concave portion 33a elongating in the upper and lower direction.

A refrigerant passage 34 is formed between both connecting surfaces 33, 34 by providing the concave portion 33a. The lower end portion of the refrigerant passage 34 is located just above the lower side separator 30.

A first communication hole 35 is formed in the connecting surface 32 of the receiver 31 at the lower area thereof and just above the lower side separator 30. The lower end portion of the refrigerant passage 34 communicates with the place, inside of the receiver 31, where the liquid refrigerant is always stored. Here, in FIG. 1, a numeral 31b denotes a liquid surface inside the receiver 31 when the refrigerant circulates appropriately under the condition that the refrigeration cycle is normally driven.

Second communication holes 36, 37 are formed at the lower positions of the receiver 31 and the second header tank 22 respectively. The position in the vicinity of the bottom of the receiver 31 communicates with the lower space 22c of the second header tank 22 through these communication holes 36, 37.

The upper end of the refrigerant passage 34 is located above the upper side separator 29. A third communication hole 38 is formed above the upper side separator 29 in the second header tank 22. The upper end portion of the refrigerant passage 34 communicates with the upper space 22a of the second header tank 22 through the third communication hole 38.

In the core portion 23, a condensing portion 39 is constructed below the upper side separators 27, 29. The gas refrigerant discharged from the compressor 1 is heat exchanged with the cooling air generated by the cooling fan (not illustrated), to be cooled and condensed in the condensing portion 39. A super-cooling portion 40 is constructed above the upper side separators 27, 29. The liquid refrigerant separated in the receiver 31 is heat exchanged with the cooling air to be super-cooled in the super-cooling portion 40.

In this way, in the refrigerant condenser 2 of the present embodiment, the condensing portion 39, the receiver 31, and the super-cooling portion 40 are structured orderly from an upstream side of the refrigerant flow. These portions 39, 31, 40 are made of aluminum and assembled by brazing integrally.

Next, an operation of the above-described structure will be described.

When the vehicle air conditioning apparatus starts, t an electric current is supplied to the electromagnetic clutch 1a, and the electromagnetic clutch 1a engages. The rotational driving force of the engine is transmitted to the compressor 1, and the compressor 1 compresses and discharges the refrigerant. The gas refrigerant discharged from the compressor 1 flows into the center space 21b of the first header tank 21 through the refrigerant inlet 26a of the joint block 26. The refrigerant flows, as denoted by an arrow A in FIG. 1, through tubes 24 in the upper portion of the condensing portion 39, and flows into the center space 22b of the second header tank 22.

The refrigerant U-turns, as denoted by an arrow B, in the center space 22b, and flows through the tubes 24 in the center portion of the condensing portion 39, and into the lower space 21c of the first header tank 21. Further, the refrigerant U-turns, as denoted by an arrow C, in the lower space 21c, and flows through the tubes 24 in the lower portion of the condensing portion 39, and into the lower space 22c of the second header tank 22.

While the refrigerant flows through the condensing portion 39, the refrigerant is heat exchanged with the cooling air to be cooled into the saturated liquid refrigerant including a little gas refrigerant. The saturated liquid refrigerant flows from the lower space 22c, through the second communication holes 36, 37, and, into the receiver 31 as denoted by an arrow D. The refrigerant is separated into the gas refrigerant and the liquid refrigerant, and the liquid refrigerant is stored in the receiver 31. The liquid refrigerant in the receiver 31 flows, as denoted by an arrow E, through the first communication hole 35, and into the refrigerant passage 34 formed between the flat connecting surfaces 32, 33. The refrigerant flows through the refrigerant passage 34, through the third communication hole 38, and into the upper space 22a of the second header tank 22. The refrigerant flows, as denoted by an arrow F, from the upper space 22a into the tubes 24 in the super-cooling portion 40.

The liquid refrigerant is further cooled into a super-cooled liquid refrigerant in the super-cooling portion 40. The super-cooled liquid refrigerant flows through the upper space 21a of the first header tank 21, and flows out of the condenser 2 through the refrigerant outlet 26b of the joint block 26.

The super-cooled liquid refrigerant flows through the site glass 3, and into the temperature responding expansion valve 4. In the temperature responding expansion valve 4, the super-cooled liquid refrigerant is pressure-reduced into the liquid-gas phase refrigerant having low temperature and low pressure. Next, the liquid-gas phase refrigerant is heat exchanged with the air to be conditioned and evaporates to the gas refrigerant in the evaporator 5. At this time, the refrigerant absorbs the latent heat of the air and cooled it. The gas refrigerant evaporated in the evaporator 5 is suctioned into the compressor 1 and compressed again.

Here, when the vehicle engine idles, e.g., for waiting a traffic signal, because there is no air generated by running dynamic pressure, the cooling air having passed through the refrigerant condenser 2 and the vehicle radiator might be lead to the air upstream side of the condenser 2 through the lower portion of the condenser 2 by the operation of the cooling fan. This cooling air has high temperature because of just after having passed through the condenser 2 and the vehicle radiator, thus the high temperature cooling air heats the lower portion of the condenser 2. However, in the present embodiment, the super-cooling portion 40 is located at the upper position of the condensing portion 39, thus the super-cooling portion 40 is not influenced by the high temperature air.

Therefore, when the vehicle engine idles, the cooling performance of the super-cooling portion 40 is kept well, and the reduction of the super-cooling amount of the liquid refrigerant is suppressed.

Here, because the refrigerant is saturated in the condensing portion 39 and the temperature thereof is higher than that of the super-cooled refrigerant, even when the high temperature air passes through the condensing portion 39, the cooling performance of the entire condenser 2 is less likely to be reduced.

(Second Embodiment)

Figure 4:
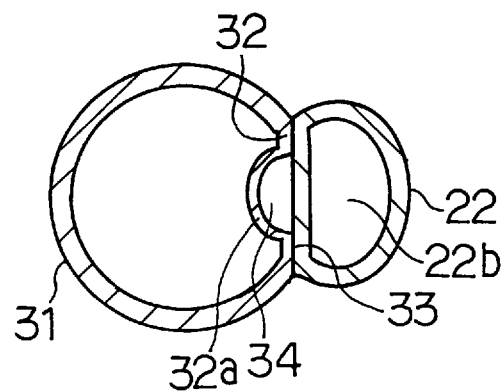
FIG. 4 is a cross sectional view showing a receiver and a second header tank according to a second embodiment, which corresponds to the cross sectional view taken along line II—II in FIG. 1.
Figure 5:
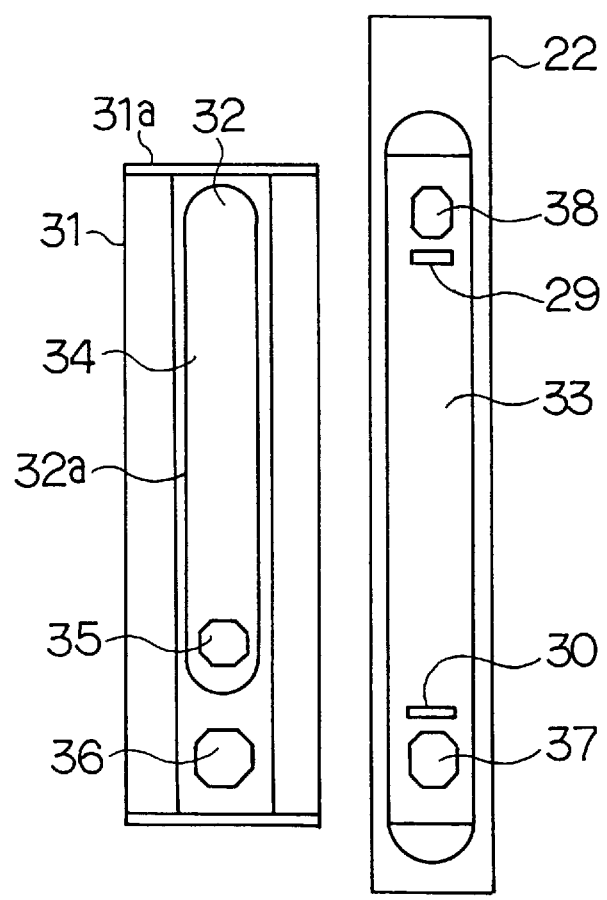
FIG. 5 is an exploded view showing a connecting surface between a receiver and a second header tank in the refrigerant condenser according to the second embodiment.

According to a second embodiment, as shown in FIGS. 4, 5, the flat connecting surface 32 of the receiver 31 has a concave portion 32a elongating in the upper and lower direction, and the refrigerant passage 34 is formed between the connecting surfaces 32, 33. The operation and performance of the second embodiment is the same as in the first embodiment.

(Third Embodiment)

According to a third embodiment, a gas-liquid separating performance of the refrigerant flowing from the receiver 31 into the super-cooling portion 40 is improved in comparison with the first and second embodiments.

In the first and second embodiments, the second communication holes 36, 37 are located in the vicinity of the bottom of the receiver 31, while the first communication hole 35 through which the refrigerant flows out is located right above the lower side separator 30. That is, the first communication hole 35 is located upper than the second communication holes 36, 37.

In the above-described layout, a vapor (gas refrigerant) included in the refrigerant at the outlet of the condensing portion 39 might be caused by a bouyancy to flow out of the receiver 31 through the first communication hole 35 before the vapor is completely separated from the liquid refrigerant.

However, in the third embodiment, as shown in FIGS. 6–9, the second communication holes 36, 37 which introduce the refrigerant into the receiver 31 are located upper than the first communication hole 35. Thus, the gas-liquid separating performance of the refrigerant flowing from the receiver 31 into the super-cooling portion 40 is improved.

Figure 6:
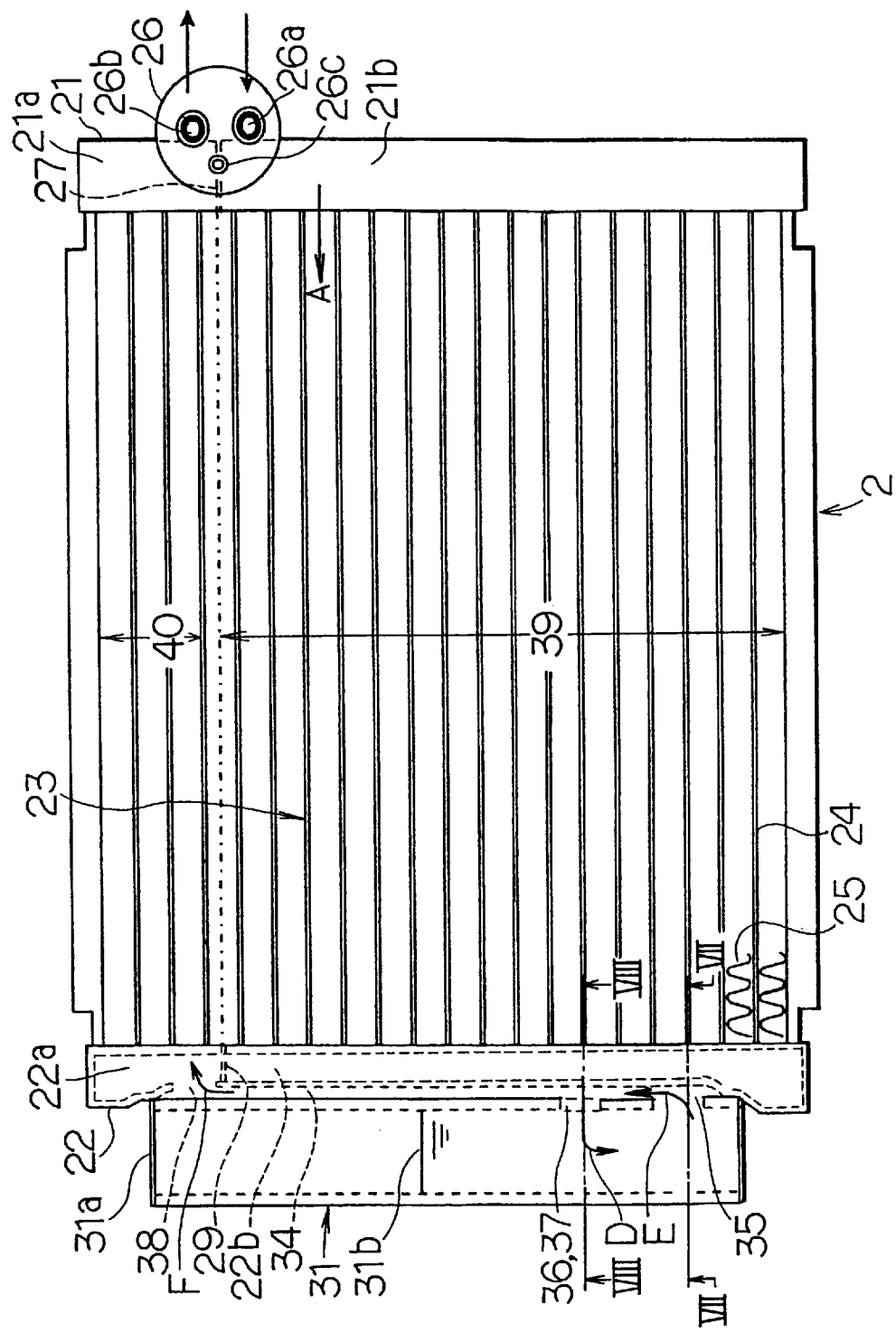
FIG. 6 is a front view showing a refrigerant condenser according to a third embodiment.
Figure 7:
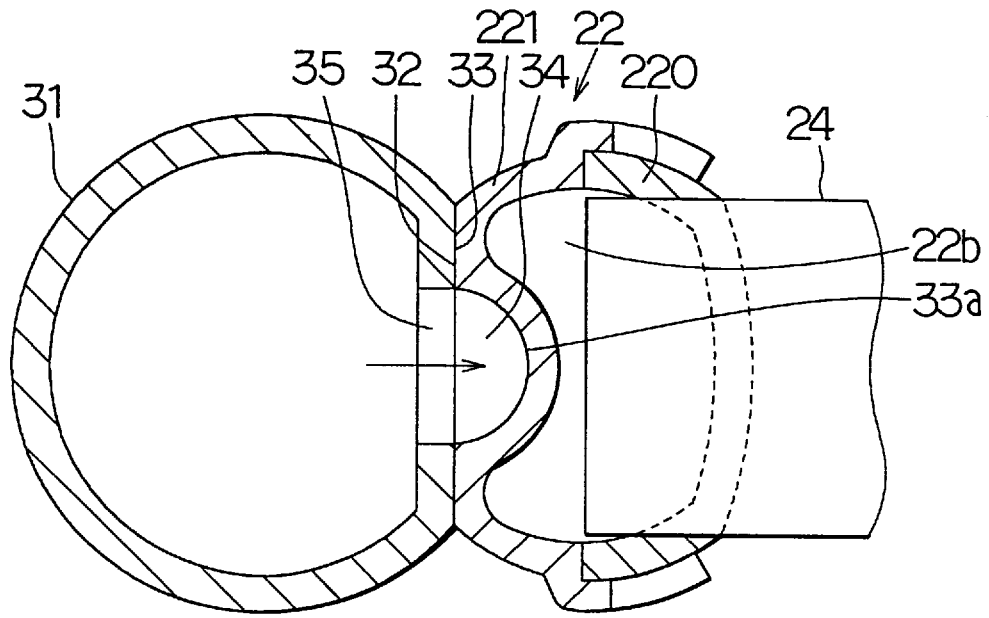
FIG. 7 is a cross sectional view taken along line VII—VII in FIG. 6.
Figure 8:
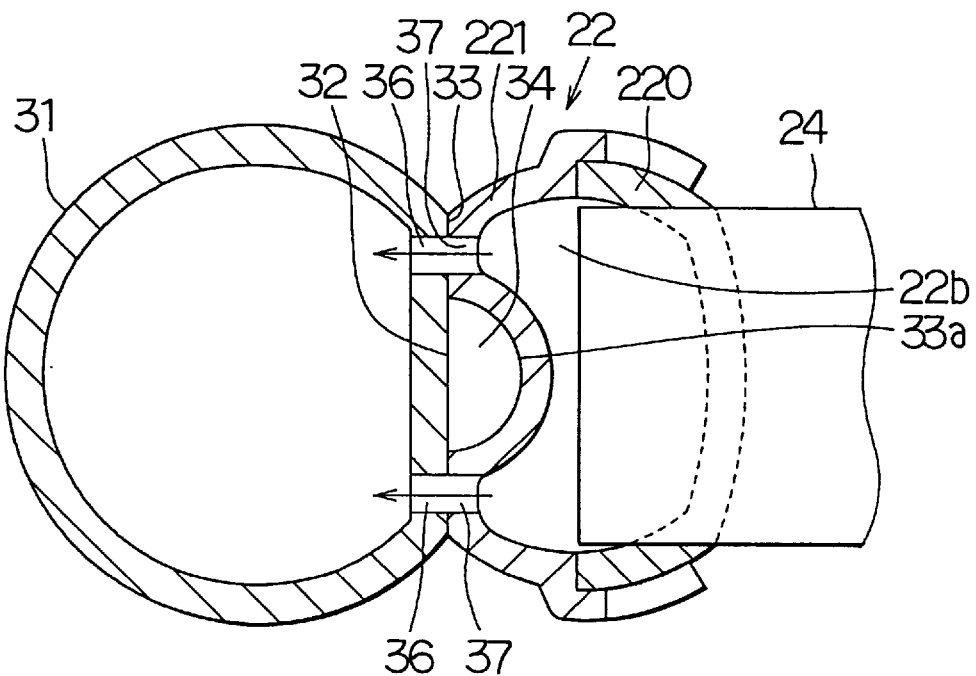
FIG. 8 is a cross sectional view taken along line VII—VIII in FIG. 6.

As shown in FIG. 6, in the third embodiment, the lower side separator 28 in the first header tank 21 and the lower side separator 30 in the second header tank 30 are not provided. Therefore, the refrigerant flows only one direction from the lower space 21b of the first header tank 21 to the lower space 22b of the second header tank 22 while being condensed into the liquid refrigerant including a little vapor (gas refrigerant).

The liquid refrigerant including a little vapor flows into the lower space 22b of the second header tank 22. After that, the refrigerant flows through the second communication holes 36, 37, and into the receiver 31. The second communication holes 36, 37 are formed by two rectangular holes elongating in the upper and lower direction and arranged at both sides of the refrigerant passage 34, for being located upper than the first communication hole 35.

Thus, even when the vapor is included in the refrigerant introduced into the receiver 31 through the second communication holes 36, 37, the vapor is caused by bouyancy to rise from the second communication holes 36, 37. Thus, the vapor does not flow into the first communication hole 35 which is disposed lower than the second communication holes 36, 37.

Figure 9:
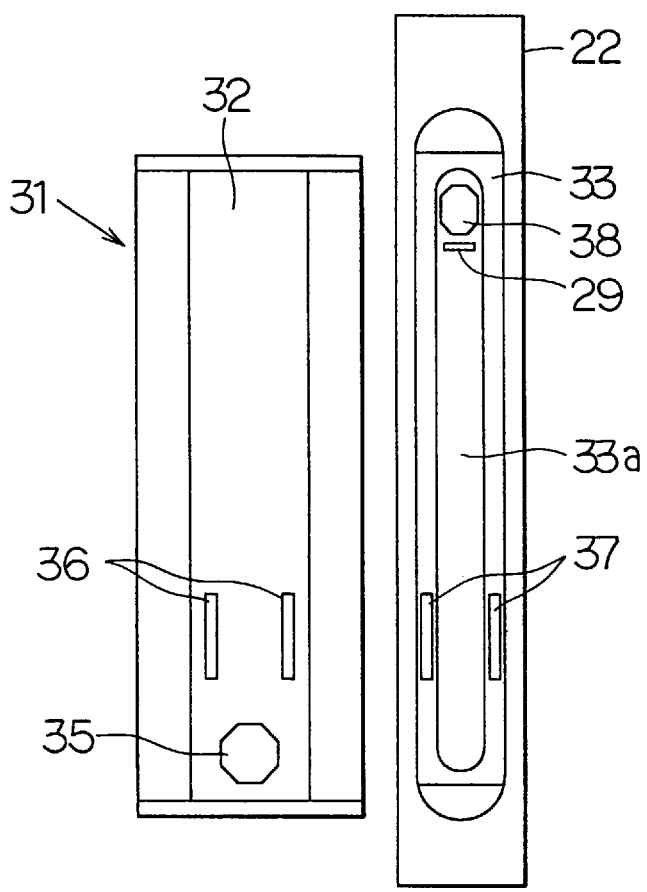
FIG. 9 is an exploded view showing a connecting surface between a receiver and a second header tank in the refrigerant condenser according to the third embodiment.

Accordingly, the liquid refrigerant is completely separated from the gas refrigerant in the receiver 31, and flows into the refrigerant passage 34 through the first communication hole 35. Here, the first communication hole 35 is, as shown in FIGS. 6, 9, formed in the vicinity of the bottom of the receiver 31, and communicates with the lower end portion of the refrigerant passage 34. The upper end portion of the refrigerant passage 34 communicates, as in the first and second embodiments, with the upper space 22a of the second header tank 22 through the third communication hole 38.

In the third embodiment, the second header tank 22 is constructed by a half cylindrical shaped first tank portion 220 into which the end of the oval flat tube 24 is inserted, and a half cylindrical shaped second tank portion 221 which is connected to the first tank portion 220. In a similar way, the first header tank 21 includes two tank portions.

Further, in the third embodiment, the concave portion 33a is formed on the flat connecting surface 33 of the second header tank 22 for forming the refrigerant passage 34. The concave portion 34a may be, as in the second embodiment (FIGS. 4, 5), formed on the flat connecting surface 32 of the receiver 31 instead.

(Fourth Embodiment)

Figure 10:
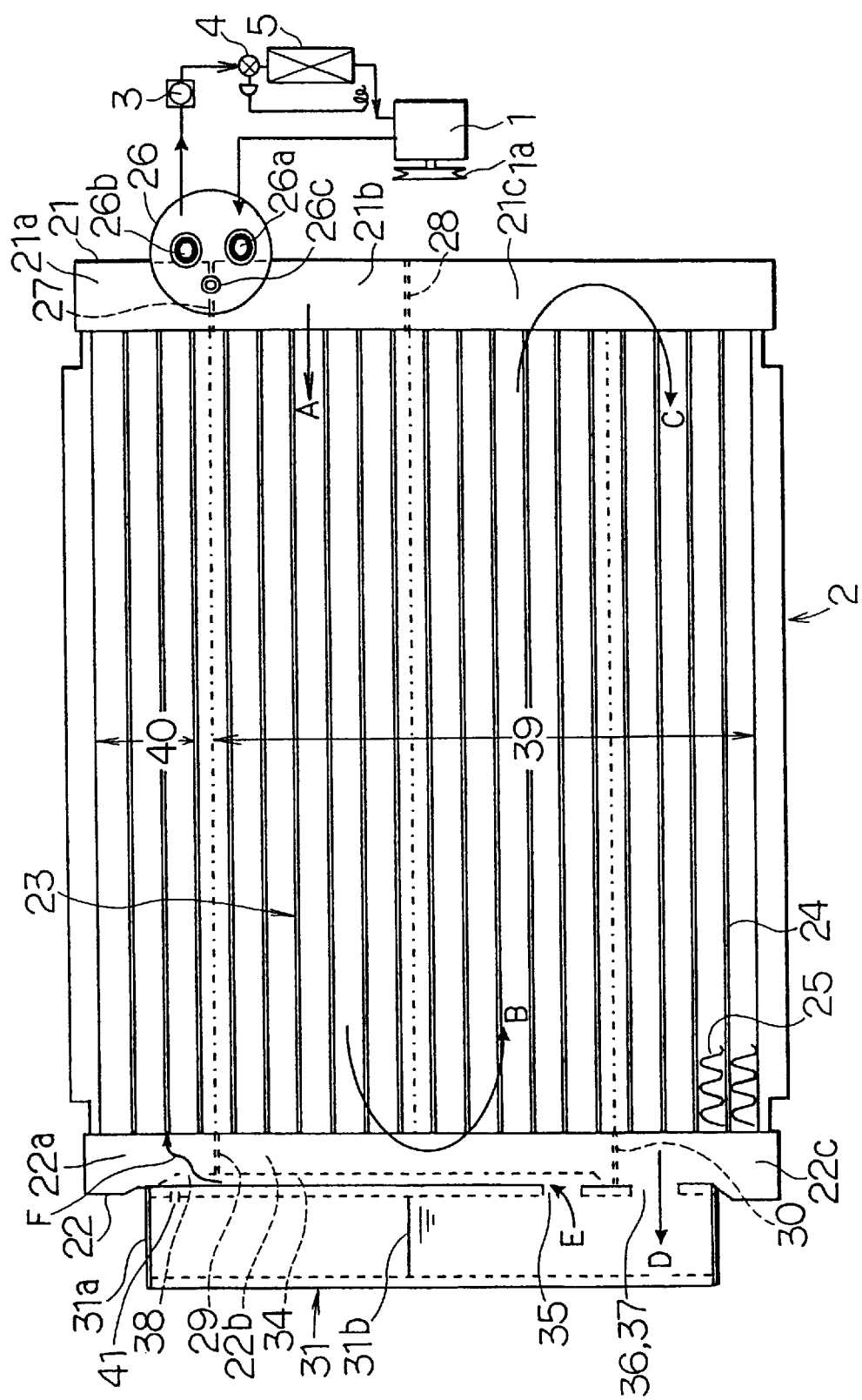
FIG. 10 is a front view showing a refrigerant condenser according to a fourth embodiment.
Figure 11:
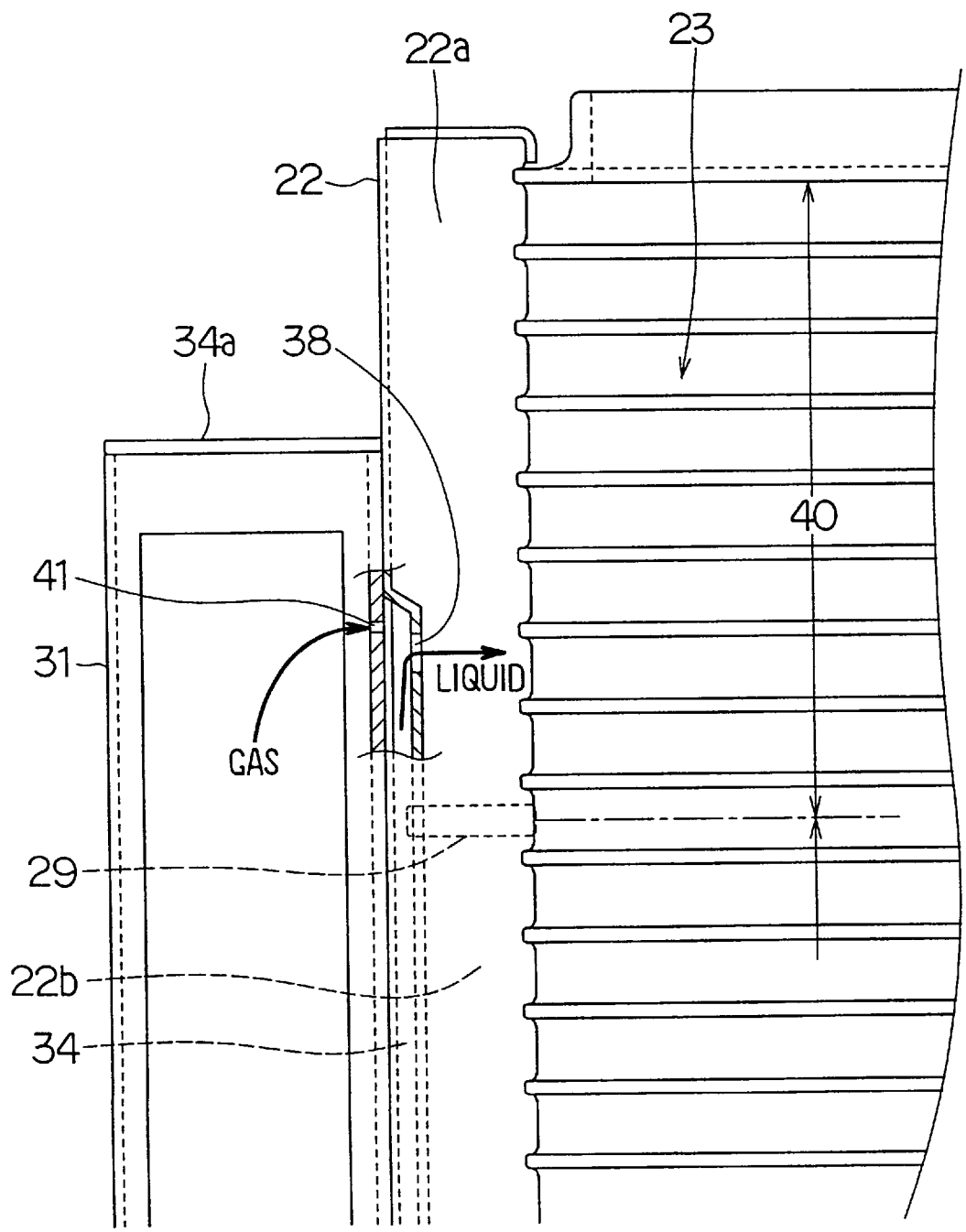
FIG. 11 is an enlarged view showing a principal part of the refrigerant condenser according to the fourth embodiment.

According to a fourth embodiment, as shown in FIGS. 10, 11, a small hole 41, the diameter of which is about 1 mm, is formed at the upper portion of the receiver 31 for making the receiver 31 communicates with the refrigerant passage 34 at the upper portions thereof.

In the above described embodiments, the cooling air having passed through the refrigerant condenser 2 and the vehicle radiator led to the air upstream side of the condenser heats the receiver 31. Thereby, the saturated liquid refrigerant evaporates in the receiver 31, and the liquid refrigerant is less likely to be stored in the receiver 31. A liquid surface of the refrigerant is less likely to rise in the receiver 31, and the liquid refrigerant is likely to be introduced into the condensing portion 39. As a result, a condensing area where the refrigerant is practically condensed becomes small, and a condensing pressure rises, thereby deteriorating a condensing performance.

However, in the fourth embodiment, because the small hole 41 is provided for making the inside of the receiver 31 communicate with the refrigerant passage 34 at the upper portions thereof, the vapor (gas refrigerant) evaporated in the receiver 31 is discharged into the refrigerant passage 34 through the small hole 41. Thereby, the liquid refrigerant is likely to be stored in the receiver 31 and the liquid surface of the refrigerant is constantly formed. As a result, the liquid refrigerant does not flow back to the condensing portion 39, thereby improving the condensing performance. Here, the small hole 41 may be formed at the upper portion of the receiver 31 in such a manner that the receiver 31 communicates with the upper space 22a of the second header tank 22 directly.

Here, as the amount of the gas refrigerant discharged through the small hole 41 is very small, the main flow of the refrigerant is not almost influenced by this.

(Modifications)

The subject of the present invention is not limited to the above-described embodiment, and may have different variations.

For example, both flat connecting surfaces 32, 33 of the receiver 31 and the second header tank 22 may have concave portions 32a, 33a for forming the refrigerant passage 34.

The receiver 31 may be disposed at the side of the first header tank 21 to which the joint block 26 is connected.

The receiver 31 may be disposed separately from the header tanks 21, 22, and may be connected to one of the header tanks 21, 22 by a refrigerant pipe. In this case, the condensing portion 33 and the super-cooling portion 33 are only integrated in the refrigerant condenser 2.

Further, in the above-described embodiments, the joint block 26 includes both refrigerant inlet 26a and refrigerant outlet 26b. Alternatively, the joint block 26 may be separated into an inlet joint block including the refrigerant inlet 26a and an outlet joint block including the refrigerant outlet 26b.

The refrigerant condenser of the present invention may be applied to different refrigerant systems used for other than vehicle air conditioning apparatus.

What is claimed is:

1. A refrigerant condenser comprising:

a core portion including a plurality of tubes extending horizontally and arranged in parallel, said core portion constructing a condensing portion for cooling and condensing refrigerant, and a super-cooling portion;

a pair of header tanks disposed at both sides of said core portion, with which both ends of said tubes communicate; and a receiver integrated with one of said pair of header tanks, for separating the refrigerant condensed in said condensing portion into gas refrigerant and liquid refrigerant and storing the liquid refrigerant therein, wherein said receiver and said one of pair of header tanks form a refrigerant passage in a connecting surface therebetween, said one of header tanks includes an upper space in an upper portion thereof, said super-cooling portion is located above said condensing portion in said core portion, and the liquid refrigerant in said receiver flows into said tubes of said super-cooling portion for being super-cooled, through said refrigerant passage and said upper space.

2. A refrigerant condenser comprising:

a core portion including a plurality of tubes extending horizontally and arranged in parallel, said core portion constructing a condensing portion for cooling and condensing refrigerant, and a super-cooling portion;

a first header tank disposed at one side of said core portion, with which one ends of said tubes communicate;

a second header tank disposed at the other side of said core portion, with which the other ends of said tubes communicate;

a first separator provided inside said first header tank for partitioning an inside thereof into an upper space and a lower space;

a second separator provided inside said second header tank for partitioning an inside thereof into an upper space and a lower space; and a receiver for separating the refrigerant condensed in said condensing portion into gas refrigerant and liquid refrigerant, and storing the liquid refrigerant therein, wherein said condensing portion is constructed by said tube disposed at a lower portion of said core portion, said super-cooling portion is constructed by said tube disposed at an upper portion of said core portion, the super-heated gas refrigerant flows through said lower spaces of said first and second header tanks, and through said tube in said condensing portion for being condensed, the refrigerant condensed in said tube in said condensing portion flows into said receiver for being separated into liquid refrigerant and gas refrigerant, and the liquid refrigerant flows through said upper spaces of said first and second header tanks, and through said tube in said super-cooling portion for being super-cooled.

3. A refrigerant condenser according to claim 2, wherein said receiver is integrated with one of said first and second header tanks.

4. A refrigerant condenser according to claim 1, further comprising:
   a first communication means for introducing the liquid refrigerant in said receiver into said super-cooling portion; and
   a second communication means for introducing the refrigerant condensed in said condensing portion into said receiver, wherein
   said first communication means is located below said second communication means.

5. A refrigerant condenser according to claim 3, wherein said receiver and said one of first and second header tanks with which said receiver is integrated form a refrigerant passage in a connecting surface therebetween, and
   the liquid refrigerant in said receiver flows through said refrigerant passage and said upper space of said one of first and second header tanks, and flows into said tube constructing said super-cooling portion.

6. A refrigerant condenser according to claim 1, wherein
   said connecting surface includes a first communication hole for introducing the liquid refrigerant in said receiver into said refrigerant passage, and second communication holes formed at both sides of said refrigerant passage for introducing the refrigerant condensed in said condensing portion into said receiver, and
   said first communication hole is located below said second communication holes.

7. A refrigerant condenser according to claim 1, wherein said refrigerant passage is constructed by a concave portion formed in said connecting surface.

8. A refrigerant condenser according to claim 1, further comprising a joint block having a refrigerant inlet and a refrigerant outlet, which is provided in a vicinity of a boundary between said condensing portion and said super-cooling portion.

9. A refrigerant condenser according to claim 1, further comprising a gas communication means for introducing the gas refrigerant in said receiver into said super-cooling portion.

* * * * *

UNITED STATES PATENT AND TRADEMARK OFFICE
CERTIFICATE OF CORRECTION

PATENT NO. : 5,875,650

DATED : March 2, 1999

INVENTOR(S) : Tetsuji Nobuta et al

It is certified that error appears in the above-identified patent and that said Letters Patent is hereby corrected as shown below:

Col. 2, line 66, "line VII - VIII" should be --line VIII - VIII--

Col. 3, line 41, delete "a"

Col. 3, line 50, delete "a"

Col. 5, line 3, delete "t"

Col. 5, line 51, delete "cooled" and substitute --cools-- therefor

Col. 5, line 54, delete "for waiting" and substitute --waiting for-- therefor

Col. 5, line 58, delete "lead" and substitute --led-- therefor

Col. 7, line 25, delete "communicates" and substitute --communicate-- therefor

Col. 8, line 1, delete "condensing portion 33" and substitute --condensing portion 39-- therefor Col. 8, line 1, delete "super-cooling portion 33" and substitute --super-cooling portion 40-- therefor

UNITED STATES PATENT AND TRADEMARK OFFICE
CERTIFICATE OF CORRECTION

PATENT NO. : 5,875,650
DATED : March 2, 1999
INVENTOR(S) : Tetsuji Nobuta et al

It is certified that error appears in the above-identified patent and that said Letters Patent is hereby corrected as shown below:

Col. 8, line 41, claim 2, delete "ends" and substitute --end-- therefor

Col. 8, line 44, claim 2, delete "ends" and substitute --end-- therefor

Signed and Sealed this

Third Day of August, 1999

Attest:

Q. TODD DICKINSON

*Attesting Officer*  *Acting Commissioner of Patents and Trademarks*